UNITED STATES PATENT OFFICE.

HUGO GALLINOWSKY, OF ST. LOUIS, MISSOURI, ASSIGNOR, BY MESNE ASSIGNMENTS, TO THE LITHOSITE MANUFACTURING COMPANY, OF SAME PLACE.

PROCESS OF MANUFACTURING CEMENT.

SPECIFICATION forming part of Letters Patent No. 605,637, dated June 14, 1898.

Application filed October 14, 1897. Serial No. 655,113. (No specimens.)

*To all whom it may concern:*

Be it known that I, HUGO GALLINOWSKY, a citizen of the United States, residing at the city of St. Louis, State of Missouri, have invented a certain new and useful Improvement in a Process of Manufacturing Cement, of which the following is a full, clear, and exact description, such as will enable others skilled in the art to which it appertains to make and use the same.

This invention relates to a new and useful process of manufacturing cement, the object being to reduce the cement to a powdered form which can be used for paints or for any uses to which Portland cement is now put.

I have found by experiment that a cement manufactured under the following processes is stronger than the ordinary Portland cement and may be applied to many uses to which Portland cement is not applicable.

I will now describe my improved process. I take a quantity of chlorid of magnesium, preferably bittern water, the usual refuse of seaside salt works. In using this bittern water I select that which is free from chlorid of sodium. I place this bittern water in a suitable receptacle and apply heat until the greater part of the water is driven off or until the specific gravity reaches about 36° Baumé. I then add a quantity of oxid of magnesium to this concentrated magnesium chlorid equal to about one-third or one-fourth the weight of said magnesium chlorid. The addition of the oxid of magnesium prevents decomposition of the chlorid of magnesium when heat is again applied. This mass is now subjected to a higher degree of heat to drive off as much of the water as possible, which results in a product comprising soft and porous lumps. These lumps are then mixed with oxid of magnesium in the proportion of about one to two or one to three, depending upon the uses to which the resultant powdered cement is to be applied. This oxid of magnesium and the lumps, consisting of chlorid of magnesium and magnesium oxid, are ground to a fine powder, after which the cement is ready to be placed on the market.

If the cement is to be used as a paint, the powder is ground very finely and mixed with a suitable quantity of water, which acts as a vehicle, the water subsequently evaporating, leaving a coating of cement on the article painted. The cement can also be mixed with water and be used for purposes common to Portland cement—that is, in conjunction with suitable fillers.

In packing this cement for the market means should be provided to exclude the admission of moisture and carbonic-acid gas.

Instead of obtaining the chlorid of magnesium from bittern water, as above described, commercial chlorid of magnesium may be used. As commercial chlorid of magnesium frequently contains calcium chlorid, I ascertain the percentage of such calcium chlorid and use a corresponding percentage of oxalic acid or oxalate of ammonia to neutralize the said calcium chlorid, introducing the neutralizing agent before the chlorid is heated. The result is that the oxalic acid or oxalate of ammonia and calcium chlorid combine, forming an oxalate of lime, which is neutral to the other ingredients of the cement and acts merely as a filler. By thus neutralizing the calcium chlorid I prevent the cement from sweating or slaking after the cement is applied to any of its uses, which would happen were the calcium chlorid still present.

In using commercial chlorid of magnesium I add oxid of magnesium, heat the two to drive off the water, and afterward mix the product with oxid of magnesium to produce the cement. This method is substantially the same as when bittern water is used, with the exception that if the commercial chlorid of magnesium is initially heated at all it is not to the extent that the bittern is heated.

It will of course be understood that proper coloring-matter can be used with this cement, care being taken that such coloring-matter will not chemically affect the ingredients of the cement.

I am aware that the proportions I have given in above formula may be changed and perhaps the method of mixing altered to suit the different processes to obtain a cement having certain qualities not present in the cement herein set forth, and it may be possible to substitute an equivalent for one or more of the ingredients of my cement, and therefore I do not wish to be understood as limiting myself to the relative porportions of said ingredients.

Having thus described my invention, what I claim, and desire to secure by Letters Patent, is—

1. The herein-described process of making oxychlorid cement, the same consisting in initially heating chlorid of magnesium, or its equivalent, to drive off water, adding oxid of magnesium, reheating the chlorid of magnesium and the oxid of magnesium to a higher degree of heat, and finally mixing the product with oxid of magnesium.

2. The herein-described process of making cement, the same consisting in mixing oxalic acid or oxalate of ammonia with chlorid of magnesium, to neutralize the calcium chlorid present in the chlorid of magnesium, heating the mass to drive off water, then adding oxid of magnesium, and again heating the mass to a higher degree of heat, and finally grinding the product with oxid of magnesium, substantially as described.

In testimony whereof I hereunto affix my signature, in the presence of two witnesses, this 12th day of October, 1897.

HUGO GALLINOWSKY.

Witnesses:
HUGH K. WAGNER,
F. R. CORNWALL.